US008031787B2

(12) United States Patent
Fechtel et al.

(10) Patent No.: US 8,031,787 B2
(45) Date of Patent: Oct. 4, 2011

(54) CHANNEL ESTIMATION FOR OFDM SYSTEMS

(75) Inventors: Stefan Fechtel, Zorneding (DE); Christian Rom, Aalborg (DE); Benny Vejlgaard, Aalborg (DE)

(73) Assignee: Infineon Technologies AG, Neubiberg (DE)

( * ) Notice: Subject to any disclaimer, the term of this patent is extended or adjusted under 35 U.S.C. 154(b) by 797 days.

(21) Appl. No.: 11/946,214

(22) Filed: Nov. 28, 2007

(65) Prior Publication Data

US 2008/0130771 A1 Jun. 5, 2008

(30) Foreign Application Priority Data

Nov. 28, 2006 (DE) .................... 10 2006 056 158

(51) Int. Cl.
*H04K 1/00* (2006.01)
(52) U.S. Cl. ........ 375/260; 375/316; 375/346; 375/349; 375/350
(58) Field of Classification Search .................. 375/260, 375/316, 349–350, 346
See application file for complete search history.

(56) References Cited

U.S. PATENT DOCUMENTS

| | | | | |
|---|---|---|---|---|
| 5,251,233 | A * | 10/1993 | Labedz et al. | 375/230 |
| 6,856,649 | B2 * | 2/2005 | Birru | 375/233 |
| 6,907,092 | B1 * | 6/2005 | Yakhnich et al. | 375/346 |
| 7,139,320 | B1 * | 11/2006 | Singh et al. | 375/260 |
| 7,339,999 | B2 * | 3/2008 | Gore et al. | 375/260 |
| 7,424,277 | B2 * | 9/2008 | Finkelstein et al. | 455/130 |
| 7,450,654 | B2 * | 11/2008 | Singh et al. | 375/260 |
| 7,675,962 | B2 * | 3/2010 | Mergen et al. | 375/147 |
| 7,747,001 | B2 * | 6/2010 | Kellermann et al. | 379/406.01 |
| 2004/0141570 | A1 * | 7/2004 | Yamazaki et al. | 375/340 |
| 2005/0163258 | A1 | 7/2005 | Gore et al. | |
| 2006/0120438 | A1 | 6/2006 | Reial | |
| 2006/0209974 | A1 * | 9/2006 | Yoshida | 375/260 |
| 2006/0227748 | A1 * | 10/2006 | Stamoulis et al. | 370/332 |

FOREIGN PATENT DOCUMENTS

EP     1 069 697 A1    1/2001

OTHER PUBLICATIONS

"A Low Complexity ML Channel Estimator for OFDM", Luc Deneire, Patrick Vandenameele, Liesbet Van Der Perre, Bert Byselinckx and Marc Engels, IEEE Transactions, vol. 51, Issue 2, Feb. 2003, pp. 135-140.

(Continued)

*Primary Examiner* — Chieh M Fan
*Assistant Examiner* — Sophia Vlahos
(74) *Attorney, Agent, or Firm* — Eschweiler & Associates, LLC

(57) ABSTRACT

In a method for channel estimation of an OFDM signal transmitted via a channel, an initial channel transfer function is calculated by channel estimation. A channel impulse response is calculated on the basis of the initial channel transfer function. Values of the channel impulse response or of a filtered channel impulse response are classified as noise or as a signal as a function of the level of the values of the channel impulse or of the level of the values of the filtered channel impulse response. A noise-reduced channel impulse response is calculated on the basis of the channel impulse response using the classification, and a noise-reduced channel transfer function is calculated on the basis of this noise-reduced channel impulse response.

9 Claims, 4 Drawing Sheets

OTHER PUBLICATIONS

"An Equalizer Initialization Algorithm for OFDM Receivers", Max Belotserkovsky, IEEE, Aug. 2002, pp. 372-373.

"MMSE Channel Prediction Assisted Symbol-by-symbol Adaptive OFDM", M. Münster and L. Hanzo, IEEE, pp. 416-420, Apr. 2002.

"On Channel Estimation in OFDM Systems", Jan-Jaap Van De Beek, Ove Edfors, Magnus Sandell, Sarah Kate Wilson and Per Ola Börjesson, IEEE, pp. 815-819, Jul. 1995.

"Two-Dimensional Pilot-Symbol-Aided Channel Estimation by Wiener Filtering", Peter Hoeher, Stefan Kaiser and Patrick Robertson, IEEE, pp. 1845-1848, Jun. 1997.

3GPP TR 25.814 V7.1.0 (22006-09), Technical Report, $3^{rd}$ Generation Partnership Project; Technical Specification group Radio Access Network; Physical layer aspects for evolved Universal Terrestrial Radio Access (UTRA) (Release 7), 23 pgs, Sep. 2006.

* cited by examiner

CHANNEL ESTIMATION FOR OFDM SYSTEMS

REFERENCE TO RELATED APPLICATIONS

This application claims the benefit of the priority date of German application DE 10 2006 056 158.9, filed on Nov. 28, 2006, the contents of which are herein incorporated by reference in their entirety.

FIELD OF THE INVENTION

The invention relates to channel estimation in OFDM (Orthogonal Frequency Division Multiplexing) systems and, in particular, to channel estimation in OFDM systems by means of interpolation in the frequency domain.

BACKGROUND OF THE INVENTION

The OFDM modulation format is used in many communication standards. The OFDM technique is used in particular for mobile communication, since it represents an effective measure against selective signal fading.

In OFDM systems, the available frequency spectrum is subdivided into a large number of narrowband orthogonal subcarriers. An OFDM symbol is transmitted via a plurality of these subcarriers (possibly all of these subcarriers). In order to demodulate the received OFDM symbols in the receiver, the receiver continuously estimates the channel transfer function (CTF). The CTF is estimated using pilot information which is embedded in the time/frequency lattice covered by the OFDM symbol stream.

Conventional channel estimators measure the CTF associated with an OFDM symbol using the pilot information transmitted via the channel, and equalize the OFDM symbol using the determined CTF. Furthermore, it is already known for the determined CTF to be transformed to the time domain, for the channel impulse response (CIR) obtained by the transformation to be processed in such a way that signal components occurring after more than a maximum delay time are removed from the CIR, and for the CIR which has been "cleaned" in this way to be transformed back to the frequency domain.

A channel estimate should produce the least possible mean square error (MSE) over a multiplicity of possible channel scenarios (different delay profiles, Doppler shifts and signal-to-noise ratios). It has been possible to show that the optimum channel estimator for OFDM systems is a Wiener filter. However, Wiener filters involve a high degree of computation complexity and, in consequence, a high level of receiver complexity. Sub-optimum channel estimators allow the complexity to be reduced at the expense of loss of performance in the channel estimation process. In practice, the channel estimate is therefore a compromise between MSE performance, receiver complexity, latency, robustness and, possibly, further influencing variables.

For these and other reasons, there is a need to develop new algorithms and apparatuses for channel estimation in OFDM systems.

BRIEF DESCRIPTION OF THE DRAWINGS

The invention will be explained in more detail in the following text using exemplary embodiments and with reference to the drawings, in which.

DETAILED DESCRIPTION OF THE INVENTION

OFDM systems and methods according to the present invention can be used in a multiplicity of present and future applications. Fields of use include, for example, digital audio broadcasting (DAB), digital terrestrial television DVB-T (Digital Video Broadcasting-Terrestrial), WLAN (Wireless Local Area Network), ADSL (Asymmetric Digital Subscriber Line) and WiMAX (Worldwide Interoperability for Microwave Access). Planned and future fields of use are fourth-generation mobile radio and EUTRA (Longterm Evolution of UTRA).

Figure 1:
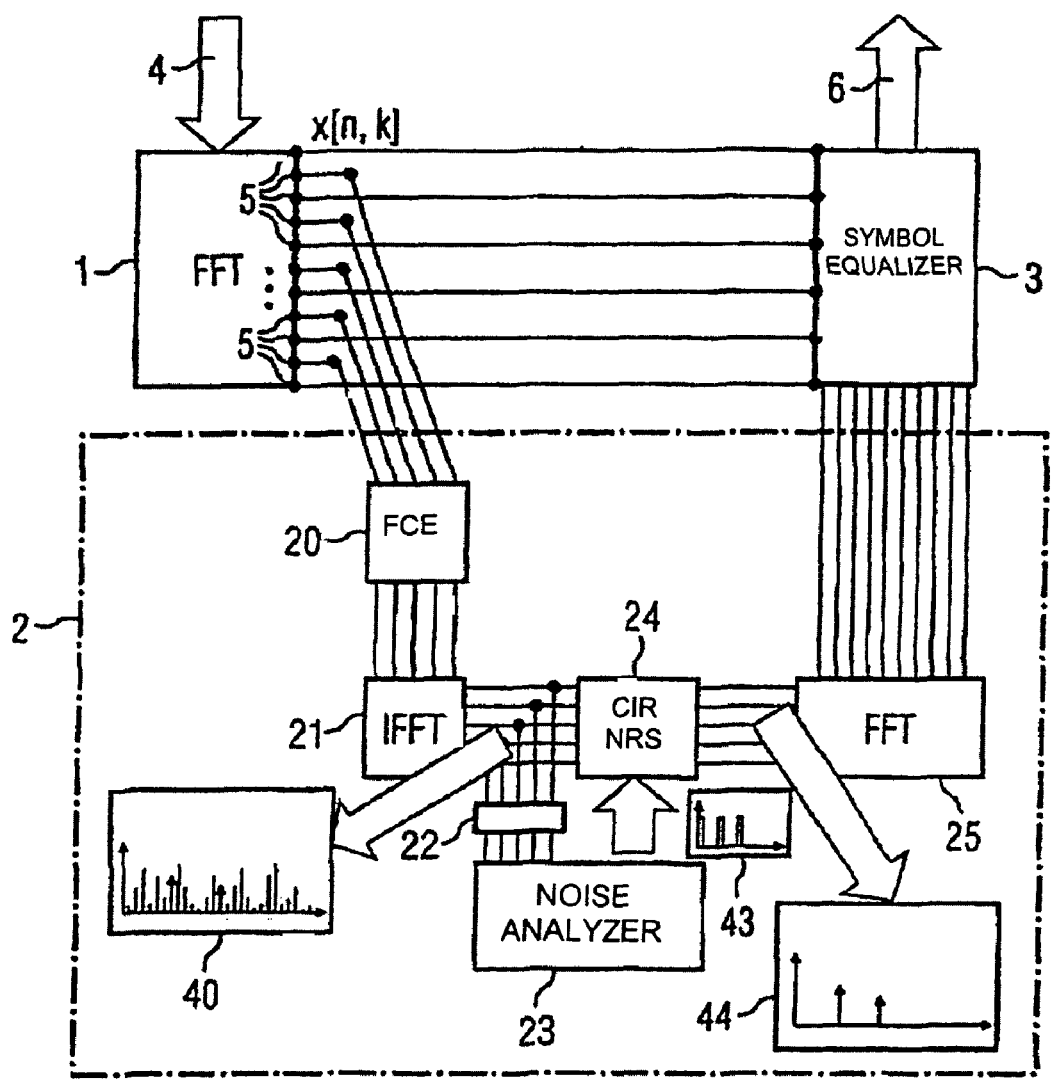
FIG. 1 shows a schematic block diagram of an OFDM equalizer with an OFDM channel estimator.

FIG. 1 shows a circuit section of an OFDM receiver according to a first exemplary embodiment. The circuit section has an OFDM demodulator 1, a channel estimator 2 and an OFDM symbol equalizer 3. The channel estimator 2 and the OFDM symbol equalizer 3 form an adaptive equalizer.

The OFDM demodulator 1 is supplied with a received signal 4. The received signal 4 may be the digitized sample values from an analogue/digital converter (not illustrated), which is arranged upstream of the OFDM demodulator 1 in the signal path. The analogue/digital converter digitizes an OFDM signal which is obtained, for example, via an air interface, may be down-mixed to a lower frequency range and forms the basis of a transmission signal which is OFDM-modulated at the transmitter end.

The OFDM demodulator 1 separates the individual subcarriers from the received signal. By way of example, this may be done by means of fast Fourier transformation (FFT). The output of the OFDM demodulator is formed, for example, by K outputs for the K subcarriers 5 (in the frequency domain) of the OFDM frequency band. An OFDM symbol output from the OFDM demodulator 1 can be indicated by x[n,k], where n denotes the discrete time, and k=0, ..., K−1 the subcarrier.

Figure 2:
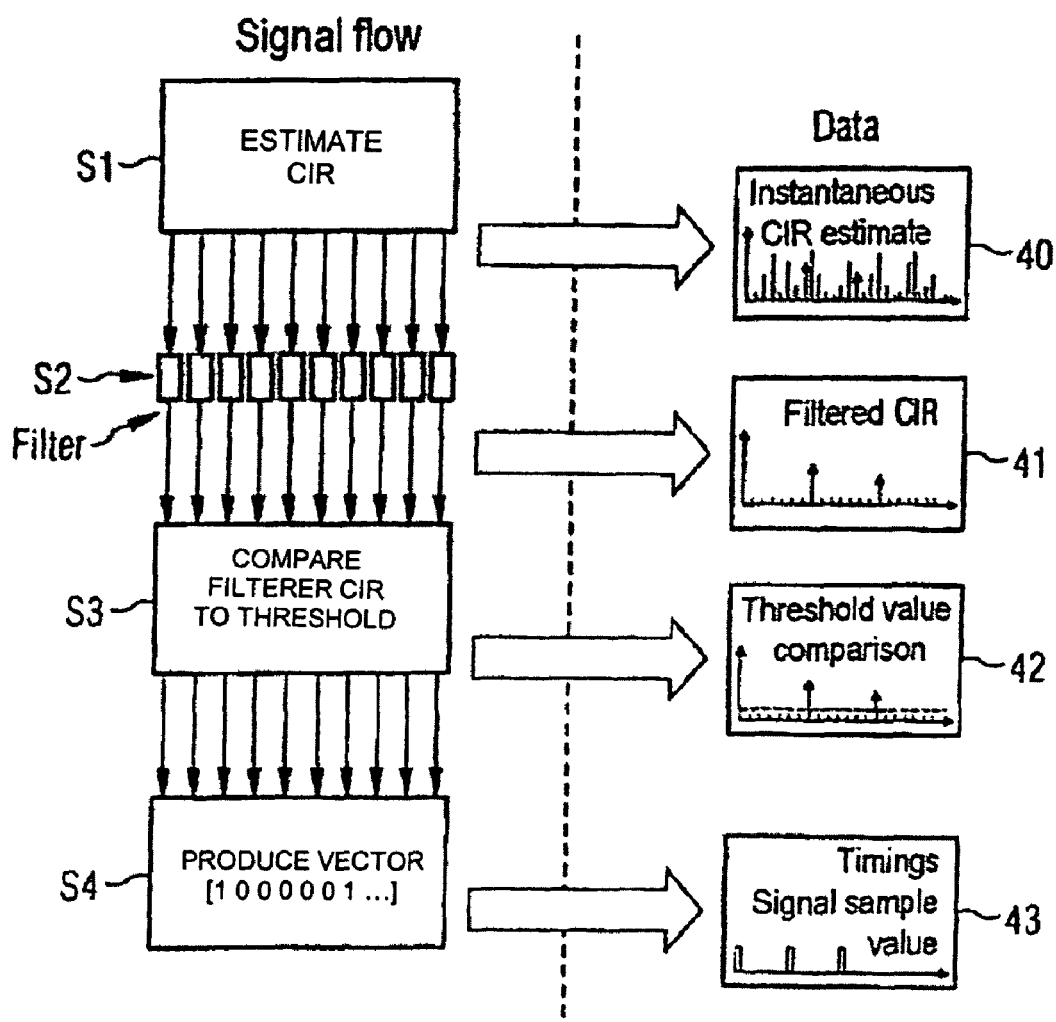
FIG. 2 shows a diagram to explain the signal processing steps in the OFDM channel estimation process.

The channel estimator 2 comprises a first channel estimator (FCE) 20, a frequency domain-to-time domain transformation stage (IFFT) 21, a filter (F) 22, a noise analyzer 23, a CIR noise reduction stage (NRS) 24 and a time domain-to-frequency domain transformation stage (FFT) 25. The method of operation of the channel estimator 2 will be explained in accordance with one exemplary embodiment in the following text with reference to FIGS. 1 and 2. In this embodiment, the left-side of the flowchart shown in FIG. 2 shows the signal flow (that is to say individual signal processing steps), and the right-hand side shows the data obtained during this process.

The first channel estimator 20 determines an initial CTF for a specific time step n. The initial CTF, which is produced at the output of the first channel estimator 20, represents the channel transfer function of the transmission channel at the time n. A very wide range of methods and algorithms can be used to obtain the initial CTF and all such alternatives are contemplated as falling within the scope of the present invention. The suitable choice of a method or algorithm such as this depends on the concept of the fundamental OFDM system and, in particular, on the distribution of pilot symbols in the time-frequency lattice of the OFDM symbol stream. For example, if, as is illustrated in FIG. 1, certain subcarriers are used solely for the transmission of pilot information, the first channel estimator 20 can be permanently connected to the appropriate outputs of the demodulator 5. The initial CTF can then be obtained in each time step n by multiplication of the pilot symbol obtained for this time step (that is to say of the "pilot subsymbol" formed from the pilot information obtained) via the inverse transmitted pilot symbol, which is known in the receiver.

It may be sufficient in one embodiment to produce an information-reduced initial CTF, for example on the basis of pilot information, which does not use all the pilot subcarriers. Furthermore, pseudo pilot symbols may be used in one embodiment, that is to say pilot symbols which are not known a priori in the receiver, but are available "a posteriori" by previous data demodulation as knowledge about the current transmitted pilot symbol in the time step n. So-called decision-directed (DD) approaches can be used for this purpose, in which OFDM symbols which have been reconstructed (that is to say equalized) in the receiver are used in the feedback path for channel estimation.

In OFDM systems in which pilot information is not provided for each time step n, the initial CTF for the time step n can be obtained by interpolation of the available pilot information in one embodiment. OFDM systems such as these are used, for example, in situations in which the transmission channels vary slowly. For example, OFDM pilot symbols can be transmitted at time intervals in systems such as these, with pilot information being transmitted over all the subcarriers. Other options are known for "scattering" pilot information in the OFDM symbol stream and such alternatives are contemplated as falling within the scope of the invention. In principle, the first channel estimate in the first channel estimator 20 can be produced in any desired manner, and for any desired pilot information patterns, on the time/frequency plane.

The first channel estimator 20 is followed by the frequency domain-to-time domain transformation stage (IFFT) 21. The frequency domain-to-time domain transformation may be carried out, in one embodiment, in the form of an inverse fast Fourier transformation (IFFT). The frequency domain-to-time domain transformation stage 21 converts the initial CTF as output from the first channel estimator 20 to an instantaneous CIR in accordance with one embodiment. The instantaneous CIR represents a "snapshot" of the channel impulse response of the transmission channel at the time n. FIGS. 1 and 2 show a diagram 40 illustrating example data of such an instantaneous CIR estimate.

In one embodiment the received energy (at the time step n) is plotted against the delay time in the diagram 40. Received energy components which result from received signals are indicated by an arrow. The remaining received energy components are noise. As can be seen in the diagram 40, the received signal is obtained from the superimposition of the signal energies which are obtained over a shortest main propagation path (for example the line of sight) and two echo paths. The instantaneous CIR is therefore also referred to as the instantaneous delayed profile in one embodiment. As can be seen from the diagram 40, the signal energy components are covered by noise.

The instantaneous CIR is passed to the CIR noise reduction stage 24. Furthermore, a copy of the instantaneous CIR is created. This copy is used in order to separate the signal contributions (that is to say the signal energy components indicated by the arrows) from the noise.

For this purpose, the copy of the instantaneous CIR is passed to the filter 22. In one embodiment the filter 22 comprises a parallel arrangement of individual filters, in which case an individual filter can be provided for each CIR sample value. In one embodiment the instantaneous CIR is filtered in the time domain. A filtered CIR is output at the output of the multichannel filter 22. The filtered CIR is shown in the diagram 41 in FIG. 2.

As can be seen from the diagram 41, the filtered CIR makes it easier to distinguish between signal contributions and noise contributions in the CIR. This is because all of the sample values in the instantaneous CIR (diagram 40) include white Gaussian noise, which is uncorrelated over time, while only some of the sample values (in this case three) contain signal contributions. These sample values which contain signal contributions (signal sample taps) are highly correlated in the time domain in successive instantaneous CIRs, since the delay profile (that is to say the timings of the sample value with high signal energy) as well as their amplitudes (channel fluctuations) change considerably more slowly than the uncorrelated white noise (which varies randomly from one time step to the next).

The filtered CIR (diagram 41) also contains sample values which are caused solely by noise, although the sample values which contain the signal energy can be distinguished from these sample values which are caused just by noise, on the basis of their signal levels.

The filtered CIR produced at the output of the multichannel filter 22 is passed to the noise analyzer 23. The noise analyzer 23 analyzes the filtered. CIR, in order to distinguish between sample values containing signal energy (referred to in the following text as signal sample values) and the sample values which are caused solely by noise (referred to in the following text as noise sample values). By way of example, the noise analyzer 23 can carry out a threshold value analysis for this purpose. In this embodiment, the filtered CIR 41 is compared with a threshold value. Sample values whose signal values are above the threshold value are identified as signal sample values. Sample values whose signal values are below the threshold value are regarded as noise sample values. The noise analyzer 23 therefore in one embodiment classifies the sample values of the filtered CIR as signal contributions and noise contributions. One embodiment of the threshold-value comparison is illustrated in diagram 42, in FIG. 2.

It should be noted that different threshold values for the noise analysis can be used along the time axis (delay) and all such variations are contemplated as falling within the scope of the invention. Furthermore, hysteresis can be produced by using two threshold values, which are used in the same time period. Furthermore, other possibilities are feasible for distinguishing between the signal sample values and the noise sample values in the filtered CIR.

The output of the noise analyzer 23 is coupled to one control input of the CIR noise reduction stage 24. The noise analyzer 23 transmits the timings of the signal sample values to the CIR noise reduction stage 24. In one embodiment the output of the noise analyzer 23 may be in the form of a Boolean vector comprising the elements 1 and 0. Each vector element has an associated time unit in the delay profile (that is to say the timing of a sample value in the filtered CIR). Times at which signal sample values occur are given the value 1. Times at which noise sample values are determined are given the value 0. The diagram 43 in FIGS. 1 and 2 illustrates the evaluation result, as obtained on the basis of the instantaneous CIR, for the time step n. As can be seen, the signal sample values are localized. In other words, the circuit which comprises the filter 22 and the noise analyzer 23 dynamically and adaptively determines the timings of the signal sample values for each time step n.

The evaluation results which are output, for example in the form of the Boolean vectors, from the noise analyzer 23 for each OFDM symbol x[n,k] are used in the CIR noise reduction stage 24 to eliminate the noise sample values in the instantaneous CIR. The CIR noise reduction stage 24 in one embodiment is used to set sample values in the instantaneous CIR, at times at which the Boolean vector has the value 0, to the value 0. Sample values at times at which the Boolean vector has the value 1 remain unaffected. The CIR noise reduction stage 24 may for this purpose, for example, be in the form of a multichannel switch, which in each case passes sample values to the outputs as a function of the controlled input, or sets the output to the value 0. A quasi-noise-free instantaneous CIR is thus produced at the output of the CIR noise reduction stage 24. This is illustrated in the diagram 44 in FIG. 1, and contains scarcely any noise contributions, now (in contrast to the filtered CIR, see diagram 41 of FIG. 2).

The quasi-noise-free instantaneous CIR (diagram 44) is passed to one input of the time domain-to-frequency domain transformation stage 25 (FFT). The time domain-to-frequency domain transformation stage 25 may be, in one embodiment, a fast Fourier transformation (FFT). A noise-reduced CTF is produced at the output of the time domain-to-frequency domain transformation stage 25 for each time step n (that is to say for each OFDM symbol x[n,k].

The output of the time domain-to-frequency domain transformation stage 25 is connected to one input of the OFDM symbol equalizer 3. The noise-reduced CTF produced for each OFDM symbol is used in the OFDM symbol equalizer 3 in order to equalize the associated OFDM symbol. The OFDM symbol equalizer provides, as an output, an equalized symbol stream 6, for example in the form of soft values. The equalized symbol stream 6 can be processed further in a downstream FEC (Forward Error Correction) decoder.

As has already been mentioned, the channel estimator 2 can be fed on the input side with pilot information that has been interpolated in the time domain, in order to calculate a noise-reduced CTF for each time step n. Another possibility is for the channel estimator 2 to process pilot information only for specific time steps, which are separated from one another, and to obtain a noise-reduced CTF, which is output for each time step, at its output, by interpolation. Furthermore, it is also possible not to carry out any "symbol-by-symbol" equalization of the OFDM data stream for slowly varying channels, in the sense that an individual noise-reduced CTF is calculated for each OFDM symbol or each time step, but in the sense that a calculated noise-reduced CTF is used for equalization of a plurality of OFDM symbols.

The above described channel estimation system and method has the advantage that it allows selective removal of noise sample values over the entire CIR. While, in the case of known channel estimation methods, noise reduction is achieved by elimination of sample values in the CIR which exceed a specific maximum delay time, it is also possible in the method described above to eliminate noise sample values which have short delay times, that is to say are in the "front" area of the CIR. Particularly in the case of channel scenarios in which a plurality of groupings of signal sample values occur in the form of a sawtooth profile, this allows a considerable improvement to be achieved in the equalizer performance.

In other words, it has been found that delay profiles of transmission channels frequently have a specific fine structure, that is to say the statistics of CIR sample values may vary to a major extent within a specific observation window (limited, for example, by a maximum delay time). Filtering of the instantaneous CIR in the filter 22 admittedly reduces the noise component in the filtered CIR (diagram 41) owing to the time correlation between successive instantaneous CIRs, but leads to incomplete elimination of noise sample values in the filtered CIR. However, this allows reliable and robust classification of CIR sample values with respect to signal sample values and noise sample values. This classification makes it possible to eliminate noise sample values in the instantaneous CIR, or another CIR calculated from the instantaneous CIR, and therefore leads to virtually complete, selective elimination of noise sample values for the relevant CIR. As in the embodiment illustrated in FIG. 1, provided that the instantaneous CIR (diagram 40) has had the noise sample values removed from it, transmission channels with high fluctuations (rapid amplitude changes in the signal sample values in the instantaneous CIR) can also be effectively equalized since no interpolation is carried out in the time domain when the noise is eliminated by the filter 22, the noise analyzer 23 and the CIR noise reduction stage 24.

FIG. 2 shows an algorithm as described above for channel estimation for OFDM symbols according to one embodiment of the invention. In a first step S1 the instantaneous CIR (diagram 40) is estimated in the already described manner. The instantaneous CIR (diagram 40) is filtered in one embodiment by means of the multi channel filter 22 in step S2. In one embodiment, one filter may be provided for each CIR sample value. The filtering results in the filtered CIR (diagram 41).

In step S3, the signal values from the filtered CIR are compared with the threshold value or with a plurality of threshold values. The method step S3 is carried out in the noise analyzer 23, and is illustrated in the diagram 42. The Boolean vector is produced as the result of the comparison in step S4 and is used to drive the CIR noise reduction stage 24 (for example in the form of activation of the sample value switches provided in this stage). The signal sample values "to be passed on" can be determined time step by time step, in one embodiment, and this process is illustrated by the dynamic, adaptive localization of the times of signal sample values, as illustrated in the diagram 43.

If the signal-to-noise ratio is high, the instantaneous CIR need not be filtered by the filter 22, although this embodiment is not illustrated. If the signal-to-noise ratio is high, it is possible to distinguish sufficiently reliably between signal sample values and noise sample values by signal level analysis in the instantaneous CIR, so that the classification based on signal sample values and noise sample values in the noise analyzer 23 can be carried out directly on the basis of the instantaneous CIR.

Figure 3:
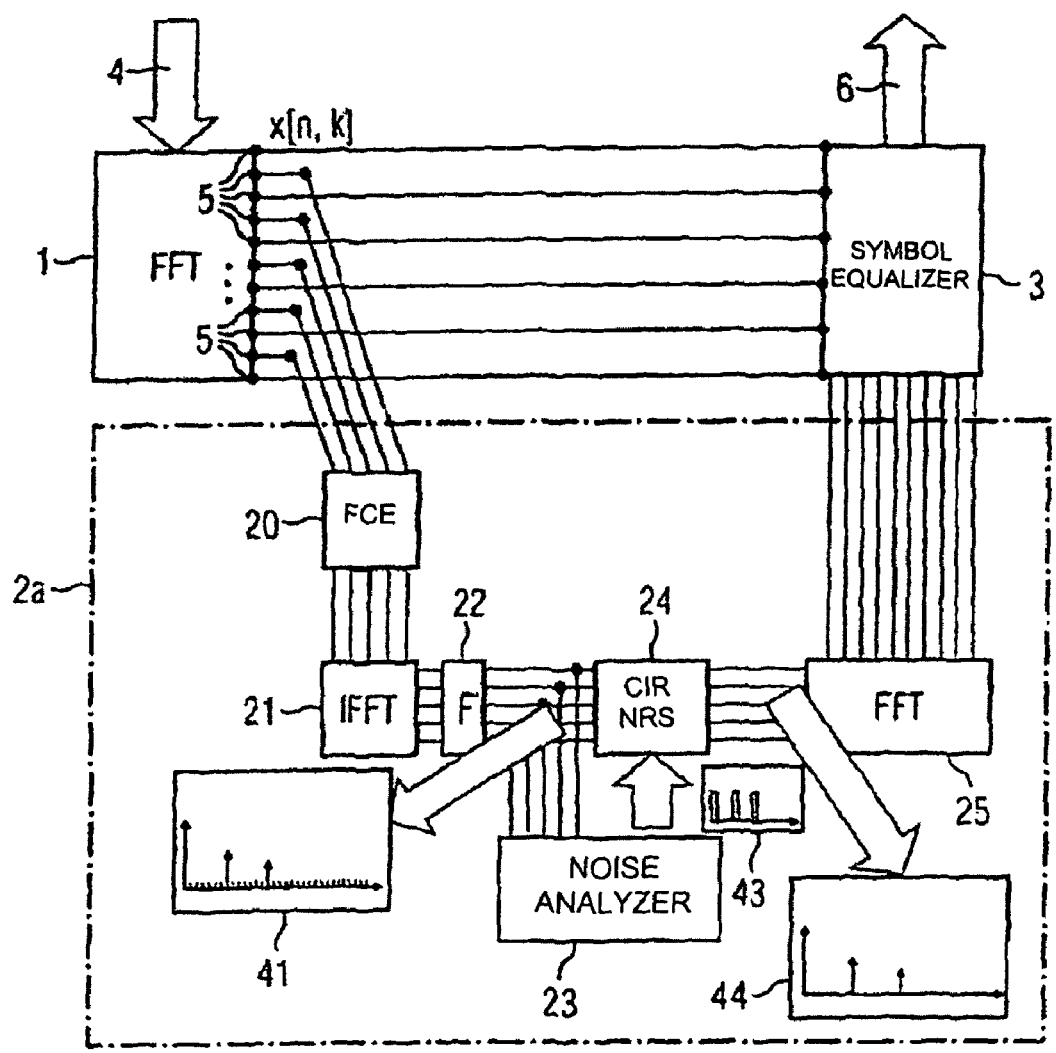
FIG. 3 shows a schematic block diagram of a further OFDM equalizer with an OFDM channel estimator.
Figure 4:
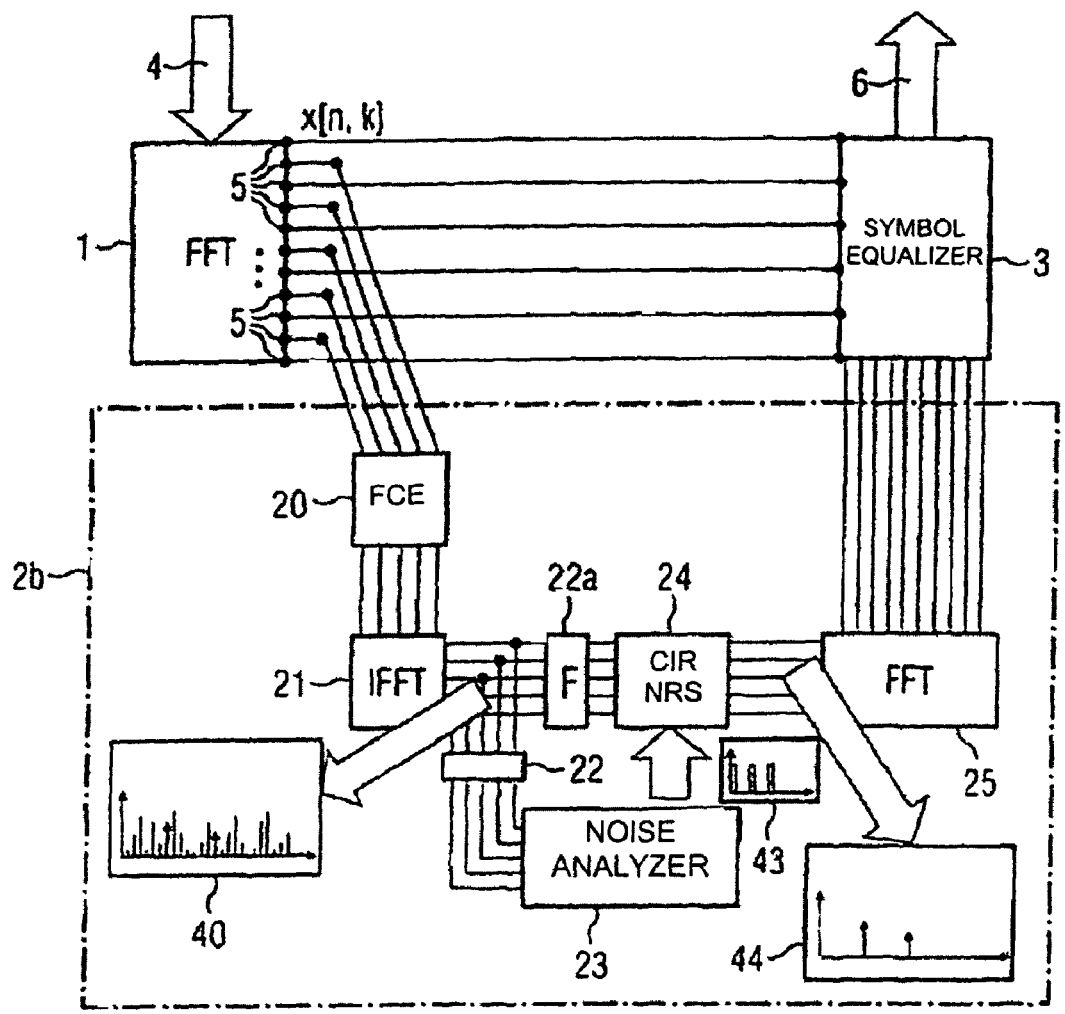
FIG. 4 shows a schematic block diagram of a third OFDM equalizer with an OFDM channel estimator.

FIGS. 3 and 4 show further exemplary embodiments of the channel estimator 2. The same or similar functional elements in FIGS. 1, 3 and 4 are annotated with the same reference symbols. The channel estimator 2a shown in FIG. 3 differs from the channel estimator 2 illustrated in FIG. 1 in that the filter 22 is located in the signal path between the frequency domain-to-time domain transformation stage (IFFT) 21 and the CIR noise reduction stage (NRS) 24. In contrast to FIG. 1, this means that the filtered CIR 41 is processed in the CIR noise reduction stage 24, rather than the instantaneous CIR (diagram 40). In one embodiment the filter length of the filter 22 in FIG. 3 is configured so that the channel fluctuations (the changes in the amplitudes of the signal sample values over time in the instantaneous CIR) are not filtered out.

As can be seen from FIG. 4, it is also possible to provide two different types of filtering in the instantaneous CIR in the channel estimator 2b. While the instantaneous CIR is subjected to a first filtering process by the filter (F) 22a on the input side of the CIR noise reduction stage 24, a copy of the instantaneous CIR (diagram 40) is subjected to a filtering process by the filter (F) 22 before the input of the noise analyzer 23. The filter 22 may, in one embodiment, have a greater filter length than the filter 22a, since the delay profile (that is to say the timings of the signal sample values) change more slowly (that is to say they have a higher time correlation level) than the amplitudes of the signal sample values in the instantaneous CIR.

By way of example, the exemplary embodiments can be implemented in a long term evolution (LTE) mobile radio terminal in the following manner. The parameters quoted in the following text are quoted in the 3GPP Standard TR 25.814. One of the possible configurations uses a sampling rate of 30.72 MHz for a fast Fourier transform (FFT) for a total number of channels of 2048, an OFDM system with 1201 usable subcarriers with a subcarrier separation of 15 kHz, and a pilot separation between 6 subcarriers in the frequency domain. The proposed subframe duration may be 0.5 ms, leading to an OFDM symbol duration of 71.4 µs. In this case, it is possible to carry out up to 14 000 estimates of the noise-reduced CIR per second.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method of channel estimation of a received OFDM signal, comprising:
    calculating an initial channel transfer function by channel estimation using the received OFDM signal;
    calculating a channel impulse response based on the initial channel transfer function;
    filtering successive channel impulse responses by a first filter having a first filter length to calculate a first filtered channel impulse response;
    classifying values of the first filtered channel impulse response as noise or signal contributions, respectively, as a function of a level of the values of the first filtered channel impulse response;
    calculating a noise-reduced channel impulse response from a second filtered channel impulse response, using the classification of the first filtered channel impulse response, wherein the second filtered channel impulse response is generated by filtering successive channel impulse responses by a second filter having a second filter length shorter than the first filter length; and
    calculating a noise-reduced channel transfer function based on the noise-reduced channel impulse response.

2. The method of claim 1, wherein the classification comprises performing a threshold-value comparison of the values of the first filtered channel impulse response, and classifying based on the comparison result.

3. The method of claim 2, wherein the values of the first filtered channel impulse response that are below a threshold value are classified as noise, and values of the first filtered channel impulse response that are above the threshold value are classified as a signal.

4. A channel estimator for a received OFDM signal, comprising:
    a first channel estimator configured to calculate an initial channel transfer function by channel estimation using the received OFDM signal;
    a frequency domain-to-time domain transformation stage configured to calculate a channel impulse response based on the initial channel transfer function;
    a first filter having a first filter length and configured to filter the channel impulse response to provide a first filtered channel impulse response;
    a noise analyzer configured to classify values of the first filtered channel impulse response as noise or signal contributions as a function of a level of the values of the first filtered channel impulse response;
    a second filter having a second filter length shorter than the first filter length, wherein the second filter is configured to filter the channel impulse response to provide a second filtered channel impulse response;
    a calculation stage configured to calculate a noise-reduced channel impulse response from the second filtered channel impulse response using the classification of the noise analyzer; and
    a time domain-to-frequency domain transformation stage configured to calculate a noise-reduced channel transfer function based on the noise-reduced channel impulse response.

5. The channel estimator of claim 4, wherein the noise analyzer comprises a threshold-value comparator.

6. The channel estimator of claim 5, wherein the noise analyzer is configured to classify values of the first filtered channel impulse response which are below a threshold value as noise, and values of the first filtered channel impulse response which are above the threshold value as a signal.

7. The channel estimator of claim 6, wherein the noise analyzer is further configured to output a vector that has the value zero for discrete time values for which the first filtered channel impulse response is classified as noise, and has the value 1 for discrete time values for which the first filtered channel impulse response is classified as a signal.

8. The channel estimator of claim 4, wherein an output of the frequency domain-to-time domain transformation stage is coupled to an input of the first filter and to an input of the second filter, and wherein an output of the second filter is coupled to an input of the calculation stage and an output of the first filter is coupled to an input of the noise analyzer.

9. The channel estimator of claim 4, wherein the frequency domain-to-time domain transformation stage is configured to perform an inverse Fourier transformation, and wherein the time domain-to-frequency domain transformation stage is configured to perform a Fourier transformation.

* * * * *